Patented Aug. 24, 1948

2,447,810

UNITED STATES PATENT OFFICE 2,447,810

RESINOUS MATERIAL CONTAINING MALEODINITRILE

David T. Mowry, Dayton, Ohio, assignor to Monsanto Chemical Company, St. Louis, Mo., a corporation of Delaware No Drawing. Application July 24, 1944, Serial No. 546,431

5 Claims. (Cl. 260—78.5)

The present invention relates to the production of resinous material by the copolymerization of $CH_2=C<$ substituted aromatic hydrocarbons and maleonitrile (maleic acid dinitrile).

An object of the present invention is to provide resinous copolymerization products of a $CH_2:C<$ substituted aromatic hydrocarbon such as styrene, alpha-methylstyrene and alpha,para-dimethylstyrene, together with maleonitrile, which products have improved physical strength characteristics as well as a higher thermal stability (heat distortion point) than does the polymerized vinyl aromatic hydrocarbon itself.

I have found that valuable interpolymerization products may be obtained by polymerizing a mixture containing maleonitrile and a $CH_2=C<$ substituted aromatic hydrocarbon such as styrene, alpha-methylstyrene or alpha,para-dimethylstyrene. If desired, mixtures of the latter three hydrocarbons may also be employed.

Maleonitrile may be prepared from cis-diiodoethylene and cuprous cyanide on the method of Jennen, Bull. Classe Sci. Acad. Roy. Belg., 22, 1169–1184 (1936). An identical product may also be obtained by the isomerization of fumaronitrile. If fumaronitrile is heated with a trace of iodine as a catalyst at 140° to 180° C. for 16 hours, a 59% conversion to maleonitrile is obtained. The pure maleonitrile boils at 99°–100° C. (13 mm.) and has a melting point of 32° C. after recrystallization from water or a mixture of benzene and hexane. If desired, mixtures of fumaronitrile and maleonitrile, as obtained by isomerization, may be employed. Such mixtures may contain from 50% to 60% of maleonitrile, the balance being fumaronitrile.

Polymerization of the above-mentioned compounds to form interpolymers may be carried out by merely heating a mixture of nitrile and the $CH_2=C<$ substituted aromatic hydrocarbon in mass, in solution or in emulsion. The temperature of polymerization may range from 50° C. to 120° C., although in some cases a higher temperature may be satisfactorily employed.

When carrying out a mass polymerization of the above-mentioned ingredients, a mixture is first prepared by dissolving the nitrile in the liquid monomeric $CH_2=C<$ substituted aromatic hydrocarbon, after which the mixture is subjected to polymerizing conditions by the application of heat either in the absence or in the presence of a polymerization catalyst. The latter may be benzoyl peroxide, acetyl peroxide or any other of the known catalysts of polymerization. For most satisfactory operation, the mixture should contain from 0.5% to 50% by weight of dinitrile, although interpolymerization will occur even with greater amounts of dinitrile present, the excess of dinitrile being readily recoverable in unpolymerized form.

The amount of maleonitrile combined as interpolymer may vary from 1% to 50% by weight of interpolymer, the amount used being dependent upon the physical characteristics of the interpolymer desired. In general, it may be said that the greater the amount of nitrile employed, the higher will be the thermal softening point or heat distortion point.

Maleonitrile is selective in respect to its copolymerizing properties. It exhibits no tendency to interpolymerize with a great many vinyl compounds such as vinyl chloride, vinyl esters such as vinyl acetate or vinyl ethers.

The present interpolymers may be readily obtained in a clear, transparent and chemically stable form. The present products may be employed for the production of transparent objects such as interlayers for safety glass and the like, for the manufacture of transparent molded articles, for electrical insulating materials, etc.

Although maleonitrile does not itself polymerize, I have found that in the presence of a $CH_2=C<$ substituted aromatic hydrocarbon it tends to accelerate rather than inhibit the copolymerizing reaction, i. e., mixtures of the above dinitrile and polystyrene tend to polymerize faster than does styrene itself. Accordingly, should it be desirable, lower temperatures may advantageously be employed for the polymerization of the herein-described mixtures. Mixtures of styrene and maleonitrile are most advantageously polymerized in mass at temperatures below about 100° C., although, if desired, higher temperatures up to, say, 120° C. may be employed. However, because of the accelerating effect of the dinitrile upon the polymerization reaction, polymerizing temperatures in the neighborhood of from 50° C. to 80° C. may be usefully employed, depending upon the rate of polymerization desired. In general, higher temperatures promote a faster polymerization.

The present interpolymers are characterized by good resistance to chemical reagents, excellent thermal stability and improved resistance to impact. In general, the copolymerization of styrene with maleonitrile in the proportion so as to yield from, say 5% to 35% of the copolymerized maleonitrile by weight in the interpolymer results in the production of resinous products having an impact resistance which is substantially greater than that of polystyrene.

Because of the accelerating effect of the maleonitrile upon the polymerization of the $CH_2=C<$ substituted aromatic compound, I may employ the polymerization process disclosed in the copending application of Reid G. Fordyce, Serial No. 503,941, filed September 27, 1943, now abandoned, which application is assigned to the same assignee as the present application.

For the production of clear, transparent, resinous products derived from monomeric styrene, I may employ mixtures of monomeric styrene and maleonitrile, in which mixtures the nitrile content is below approximately 50% by weight and preferably below 35% by weight of said mixture. During polymerization by mass or solution methods, and depending upon the relative proportions of the dinitrile and the $CH_2=C<$ substituted aromatic hydrocarbon present in the mixture undergoing polymerization, one of the constituents thereof will enter the growing polymer chain at a greater rate than the other constituent. It may, accordingly, be desirable during polymerization to maintain constant concentration of the constituent which enters the copolymer at the highest rate. This may be done as described in the abovementioned application Serial No. 503,941 by a determination of the concentration of the respective monomers and copolymer present and then adjusting the concentration of the monomeric mixture to that originally present in the mixture.

The polymerization of mixtures of the $CH_2=C<$ substituted aromatic hydrocarbon with the dinitrile, if desired, may be carried to completion, i. e., carried to the stage where a hard, solid, resinous material is obtained which is substantially free from monomeric material. Such a method is useful when producing cast objects. For most purposes, however, the polymerization is generally carried to a degree which is short of complete polymerization and the interpolymer thereafter recovered by solution in a solvent such as benzol or dioxane, which solution is then poured into a lower aliphatic alcohol wherein the interpolymer is insoluble and in which the unpolymerized monomeric materials still present are soluble. Such a procedure results in the production of a finely divided, powdery to fibrous, colorless to slightly yellowish material which may be washed free of adhering monomeric materials and solvents and then dried. The material is then suitable for use as a molding powder.

The invention is further illustrated by means of the following examples which are given for the purpose of illustration and are not to be considered as limitations upon the present invention.

Example 1

A mixture consisting of 70% by weight of monomeric styrene and 30% by weight of maleonitrile is made by dissolving the latter in the styrene and then heating the mixture in the absence of a catalyst at 70° C. for 11 days, after which the material is further heated at 100° C. for 2 days.

A hard, clear, amber, resinous material, insoluble in benzene, but soluble in acetone and dioxane, was obtained. It contained 18.9% of alcohol soluble material. The alcohol soluble material was removed from the resinous material by solution in dioxane, followed by precipitation of the copolymer in alcohol.

The powdery material thus obtained contained 10.3% of nitrogen, equivalent to 28.6% of maleonitrile. It was molded by compression in a heated die and found to have an ASTM heat distortion point substantially higher than that of polystyrene.

In place of styrene, alpha-methylstyrene or alpha,para-dimethylstyrene, or mixtures thereof with styrene, may be employed. It is also practical to substitute fumaronitrile for part of the maleonitrile.

Example 2

A monomeric mixture of styrene and maleonitrile, said mixture containing approximately 2.5% by weight of dinitrile, is polymerized by heating in the presence of a polymerization catalyst to a temperature of 50° C. to 60° C. with stirring. During the polymerization, samples of the mixture are withdrawn and the content of copolymer in the mixture determined by precipitation in alcohol. The content of the dinitrile in the copolymer may be determined by analysis of its nitrogen content. Based upon the analysis the amount of composition of the copolymer may be determined as well as the concentration of the dinitrile in the monomeric mixture. As a result of such an analysis, the amount of interpolymer present, as well as the composition of the interpolymer and the monomeric mixture containing the same, may be evaluated. Based upon such a determination the monomeric mixture may be adjusted to that originally present and the composition of the copolymer with respect to dinitrile maintained at a substantially constant value throughout the polymerization.

When polymerizations are carried out as above described, i. e., in the absence of a solvent, the degree of polymerization may be carried to the point where the mixture contains between, say, 20% and 30% by weight of the interpolymer. At this point the viscosity of the mixture ordinarily becomes too high for the maintenance of uniformity and the polymerization may be interrupted and the interpolymer recovered by solution in a solvent followed by precipitation by addition of a mixture to alcohol.

If desired, the polymerization may be carried out in solution in a solvent such as benzol or dioxane, in which case the polymerization may be carried to a greater content of copolymer than was possible in the absence of a solvent. By the use of suitable amounts of solvents the extent of polymerization may be carried to 60% to 70% of completion. Polymeric material is recovered by precipitation in alcohol. In this manner a moldable interpolymer which is clear and homogeneous may be obtained.

The solubility of the resinous interpolymer depends upon the amount of copolymerized maleonitrile contained therein. Interpolymers containing up to about 20% of the dinitrile are soluble in aromatic hydrocarbons such as benzene, toluene, chlorinated hydrocarbons such as chloroform, carbon tetrachloride and ethylene dichloride and also soluble in dioxane and acetone. They are insoluble in alcohol and gasoline.

The interpolymers containing above about 20% of copolymerized maleonitrile are soluble in dioxane, acetone and ethylene dichloride, and are insoluble in aromatic hydrocarbons, the lower aliphatic alcohols and in chlorinated hydrocarbons other than ethylene dichloride. The interpolymerization of the $CH_2=C<$ substituted aromatic compound and maleonitrile may also be carried out in the presence of plasticizers and plasticized resinous bodies obtained.

Example 3

A mixture comprising 70 g. of styrene, 30 g. of maleonitrile and 30 g. of butyl phthalyl butyl glycollate is polymerized by heating at a temperature of 80° C. for 15 days and then at 120° C. for one day. The resulting hard, clear resin is ground to a powder and then milled on heated rolls. If desired, coloring matter may be added, while milling. The milled material is then reduced to a powder and may be molded in heated dies for the production of various objects.

Various other proportions of a $CH_2=C<$ substituted aromatic compound and maleonitrile may also be employed in the presence of plasticizers. Other plasticizers such as tricresyl or triphenyl phosphate may also be employed in a similar manner.

Example 4

A mixture consisting of 85 g. of monomeric styrene and 15 g. of maleonitrile is emulsified to a fine milk in 120 g. of water containing 3 g. of disodium phosphate, 0.8 g. of citric acid and 0.04 g. of potassium persulfate and also containing 12.4 g. of sodium lorol sulfate as an emulsifying agent. The pH of emulsion is about 5.0. The emulsion is polymerized by refluxing (boiling under a reflux condenser for 15 minutes). The emulsion is then broken by pouring into methyl alcohol and the precipitated polymer is filtered, washed with alcohol and water and then dried. Alternatively the emulsion may be broken by adding a solution of an electrolyte.

The dried, finely divided polymer may then be used directly as a molding powder or it may be milled on heated rolls, the sheet thus obtained comminuted and employed in hot molding operations.

The herein-described interpolymers are resistant to acids and alkalies, i. e., there is no tendency of the nitrile groups in the interpolymer to hydrolyze. The present products are insoluble in dilute or concentrated acids and dilute or concentrated aqueous alkalies. They are free from carboxy groups and also salt groups.

This application is a continuation-in-part of my copending application Serial No. 450,514, filed July 11, 1942, now abandoned.

What I claim is:

1. The process which comprises forming a polymerizable mixture consisting of a $CH_2:C<$ substituted aromatic hydrocarbon selected from the group consisting of styrene, alpha-methylstyrene and alpha,para-dimethylstyrene, together with maleodinitrile, said mixture containing between 0.5% and 50% by weight of said maleodinitrile and then heating said mixture to a polymerizing temperature to form an interpolymer.

2. The process which comprises forming a polymerizable mixture consisting of styrene and maleodinitrile said mixture containing between 0.5% and 50% by weight of maleodinitrile and then heating said mixture to a polymerizing temperature to form an interpolymer.

3. A resinous material comprising an interpolymer of styrene and maleonitrile, said interpolymer containing between 5% and 35% of copolymerized maleodinitrile the balance thereof being copolymerized styrene.

4. A resinous material comprising an interpolymer consisting of a $CH_2=C<$ substituted aromatic hydrocarbon selected from the group consisting of styrene, alpha-methylstyrene and alpha,para-dimethylstyrene copolymerized with maleodinitrile, said interpolymer containing between 1% and 50% of copolymerized maleodinitrile.

5. A resinous material comprising an interpolymer consisting of styrene and maleodinitrile, said interpolymer containing between 1% and 50% of copolymerized maleodinitrile.

DAVID T. MOWRY.

REFERENCES CITED

The following references are of record in the file of this patent:

UNITED STATES PATENTS

| Number | Name | Date |
|---|---|---|
| 1,683,402 | Ostromislensky | Sept. 4, 1928 |
| 2,321,422 | Robie | June 8, 1943 |

FOREIGN PATENTS

| Number | Country | Date |
|---|---|---|
| 814,093 | France | Mar. 8, 1937 |